United States Patent
Fougere (10) Patent No.: US 6,978,865 B2
(45) Date of Patent: Dec. 27, 2005

(54) SAFETY CHOCK (75) Inventor: Robert Vincent Fougere, Dartmouth (CA)

(73) Assignee: Safety Chock Systems International Incorporated, Dartmouth (CA)

( * ) Notice: Subject to any disclaimer, the term of this patent is extended or adjusted under 35 U.S.C. 154(b) by 0 days.

(21) Appl. No.: 10/467,016

(22) PCT Filed: Aug. 13, 2001

(86) PCT No.: PCT/CA01/01144
§ 371 (c)(1),
(2), (4) Date: Aug. 1, 2003

(87) PCT Pub. No.: WO02/062638
PCT Pub. Date: Aug. 15, 2002

(65) Prior Publication Data
US 2004/0069574 A1 Apr. 15, 2004

(30) Foreign Application Priority Data
Feb. 2, 2001 (CA) ............................. 2334087

(51) Int. Cl.⁷ ................................ B60T 3/00
(52) U.S. Cl. ...................... 188/4 R; 188/32
(58) Field of Search ................... 188/4 R, 32

(56) References Cited

U.S. PATENT DOCUMENTS

| | | | |
|---|---|---|---|
| 2,014,565 A | | 9/1935 | Hartshorne .............. 188/30 |
| 2,748,895 A | | 6/1956 | Lucchetti ................ 188/36 |
| 2,852,101 A | * | 9/1958 | Rappaport ............... 188/4 R |
| 3,086,619 A | * | 4/1963 | Grotz .................... 188/4 R |
| 3,176,798 A | * | 4/1965 | Nesselberger ............ 188/4 R |
| 3,625,313 A | * | 12/1971 | Lowrie ................... 188/4 R |
| 4,825,978 A | * | 5/1989 | Verano ................... 188/4 R |
| 5,435,418 A | * | 7/1995 | Warren et al. ........... 188/4 R |
| 5,439,076 A | * | 8/1995 | Percy, Jr. ............... 188/4 R |
| 5,497,857 A | * | 3/1996 | Warren et al. ........... 188/4 R |

FOREIGN PATENT DOCUMENTS

| | | | | |
|---|---|---|---|---|
| CH | 466732 A | * | 12/1968 | |
| DE | CH466 732 | | 11/1967 | ............ B60S/9/00 |
| FR | 1087996 | | 9/1953 | |
| FR | 1087996 A | * | 3/1955 | |
| GB | 206993 | | 11/1923 | |
| GB | 277195 | | 9/1927 | |
| GB | 277195 A | * | 9/1927 | |
| WO | WO 00/64715 | | 11/2000 | ............ B60T/1/00 |

* cited by examiner

Primary Examiner—Robert A. Siconolfi
(74) Attorney, Agent, or Firm—Grossman, Tucker, Perreault & Pfleger, PLLC (57) ABSTRACT A safety chock (16) for large wheeled vehicles. A torque arm component (26, 24, 20, 21) maintains and positions an underside face (37) of a shoe (30) in proper position relative to the travelling surface (14), when moving the chock (16) from a cruise position to a chocking position. A tierod assembly (24, 28, 27, 23, 21) positions a receiving face (31) of the shoe (30) to engage the wheel (13). The two components rotate in concert to accurately place the shoe (30) to engage the wheel (13) in an optimal chocking position as the shoe receiving face (31) is engaging the periphery of the wheel (13) simultaneously with the shoe underside face (37) contacting the traveling surface (14). This safety chock (16) operates independent of the ride or loaded height of the vehicle as it is attached to the axle (12), or the suspension components of the vehicle.

20 Claims, 8 Drawing Sheets

SAFETY CHOCK

BACKGROUND OF THE INVENTION

1. Field of Invention

The present invention generally relates to wheel-blocking devices and in particular a safety chock for large wheeled vehicles.

2. Related Art

The operators of trucks and other large wheeled vehicles are required by law or by the insurance companies to use safety devices to prevent accidents due to slipping or sliding of trucks on steep grades, slippery pavement, or when loaded by a forklift, or a crane.

It is known that for starting a large wheeled vehicle parked on a grade, the vehicle has a tendency to roll backwards before the clutch is fully disengaged. In addition, if the road is slippery, the vehicle may slide and the motor "killed" before starting the forward motion.

It is customary for truck drivers to carry blocks of wood, or metal, to be placed under the tires in the direction of the anticipated roll. This operation becomes particularly difficult for the person positioning the wheel blocks when they have to run around the truck to place the block under each wheel one at a time. This creates a potentially lethal condition for side-slipping, which may result in the truck swinging around, or in unintended movements of the vehicle that may overrun the block. In addition, there are numbers of blocks left on highways and this may lead to undesired traffic accidents. It is known that a wooden chock forgotten on the deck of a ferry was the cause of a serious accident.

Installing mechanical wheel blocks for a tractor pulling a trailer up a hill may be more demanding as the blocks have to be first applied to the more elevated wheels so as to maintain tension in the coupler and this may result in a doubling, or jack-knife action. Moreover, collecting the wheel blocks at departure time does not help the drivers' morale and includes a number of activities for loosening the blocks, as there is always a natural tendency of the vehicle to trap the blocks. The driver has to get in the cabin and start the vehicle, move the vehicle so as to loosen the wheel blocks, stop the vehicle and step out to collect the blocks, store the blocks in dedicated places, and climb back in the cabin to start the journey.

Large vehicles like trucks, tractor-trailers, and buses are provided with emergency brake systems that are actuated in the event of failure of the vehicle's normal service brake system. The emergency brake system, or the maxi-brake, may also fail due to a variety of reasons and it is considered unsafe to park a large wheeled vehicle on a grade, or slippery pavement secured with the maxi-brake only.

On some locomotives, the application of the handbrake actuates an air release valve to the brake cylinder on the side of the truck where the handbrake is operated. There have been incidents of rollaway locomotives because of the failure of this release valve. In many cases, employees have applied the handbrake and shut down the locomotives, only to discover later that the handbrake was not applied after the air leaked off.

In another instance, the so called "dead man's pedal" fails to operate and the train's main brakes can not be automatically applied. Such an incident occurred on May 16, 2001, when a train with 47 cars, some containing hazardous materials, traveled 66 miles unmanned through the state of Ohio.

Conventional rail skates are cast metal alloys that are designed to lift and carry the car wheels. If a railcar is moving at slow speeds and the rail skate is thrown under the wheel, or if the railcar is stationary but acted upon by an external force, the rail skate may slide along the rail, metal to metal, that may cause sparks and a potential fire. This is a potentially dangerous situation when tankers carrying petroleum or chemical agents are involved. Also, when the railcar is moving at slow speeds and the rail skate is thrown under the wheel, the rail skate jumps around violently has the potential to fall off the rail and provides no braking or "chocking" effect at all, putting the operator in a dangerous situation of trying to position another rail skate.

The servicing or the testing of the main air brakes can be more challenging when the railcar(s) have been disconnected from a source of compressed air for a period of time exceeding the so-called "hour rule" as stipulated in the Federal Railway Association (FRA) Regulations. When the railcar is already at rest, by design, the traditional rail skate does not prevent the railcar from potentially moving in small-unintended movements, for example when the handbrake is released by an inspector to inspect the brake components or functionality, especially if there is a small grade that has gone undetected by the inspector.

In some cases, the rail yard area or other areas where cars are located may be subject to vandalism where the brake system, either the air or the handbrake, may be compromised. The use of the traditional rail skate would be ineffective in such cases because it can be removed with relative ease.

French Patent No. 1,087,996 issued Sept. 17, 1953, to Dorrschuck, discloses a chock with torque arm component formed by two articulated arms (15,16) and a torque arm assembly (18,19). Because arms 15,16, are rotatably coupled this breaking system provides less rigidity and thus a less efficient breaking effect. In addition, because the torque arm (18,19) is rigidly attached to shoe (17) the torque arm is not capable to position the shoe (17) for simultaneous engagement of the wheel and of the travelling surface. In fact due to such lack of synchronism, shoe (17) needs rollers on the underside face to avoid "digging" and overrunning.

Accordingly, there is a need for an independent and fully automated chocking device which is physically attached to the vehicle while remotely actuated to provide constant braking effect for large wheeled vehicles.

SUMMARY OF THE INVENTION

The present invention seeks to overcome the disadvantages of the prior aft associated with parking brake systems for large wheeled vehicles.

According to one aspect of the invention, a safety chock for large wheeled vehicles is provided. The safety chock comprises a shoe having a receiving face and a underside face; actuating means; a torque arm component coupled to the actuating means for moving the shoe from a cruise position to a chocking position: and a tierod assembly. The adjustable rod assembly comprises means for seating and positioning said shoe in optimal chocking position, such that, when actuated, the torque arm component and the tierod assembly move in concert to position the receiving face of the shoe to engage the periphery of the wheel and the underside face of the shoe to contact the traveling surface substantially at the same time.

BRIEF DESCRIPTION OF THE DRAWINGS

The invention will be now explained by way of example only and with reference to the following drawings.

Similar references are used in different figures to denote similar components.

DETAILED DESCRIPTION OF THE PREFERRED EMBODIMENT

The following description is of a preferred embodiment by way of example only and without limitation to combination of features necessary for carrying the invention into effect.

The present invention relates to a chocking shoe, herein referred to as the "shoe", that is efficiently positioned when deployed from the "cruise" to "parked" position, through the combined movement of a fixed structure and an adjustable positioning structure. It is the motion of these two structures working in concert that enables to position and seat the shoe to engage exactly at the same time the wheel and the traveling surface.

This safety chock can be manually actuated, or remotely deployed into the chocking position and retracted to the cruise position. The combined motion of the fixed structure and the adjustable positioning structure prevents the tip of the shoe from "digging" into the traveling surface and ensures accurate positioning and seating of the shoe for maximum chocking effect. Because it is attached to the axle, or to the suspension components of the vehicle, it operates independent of the ride or loaded height of the vehicle. Such an attachment prevents to "overrun" the shoe as in the case of traditional chocks. Moreover, the safety chock of the invention is a cost effective solution and may be easily transferred from a vehicle to another without major changes.

Figure 1A:
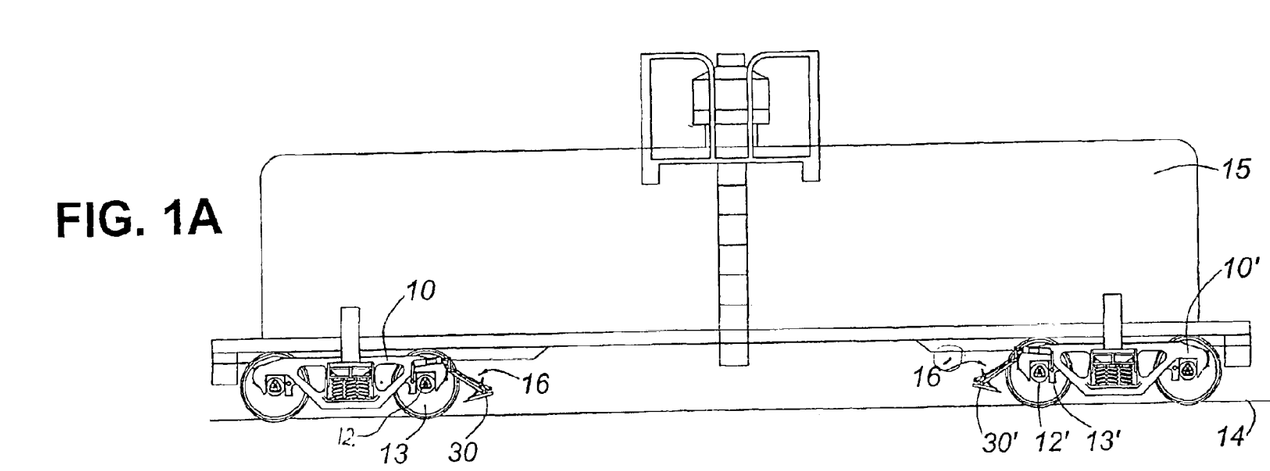
FIGS. 1A and 1B are front elevations of a railcar axle mounted safety chock shown in both the retracted (cruise) and deployed (chocking) positions, respectively.
Figure 1B:
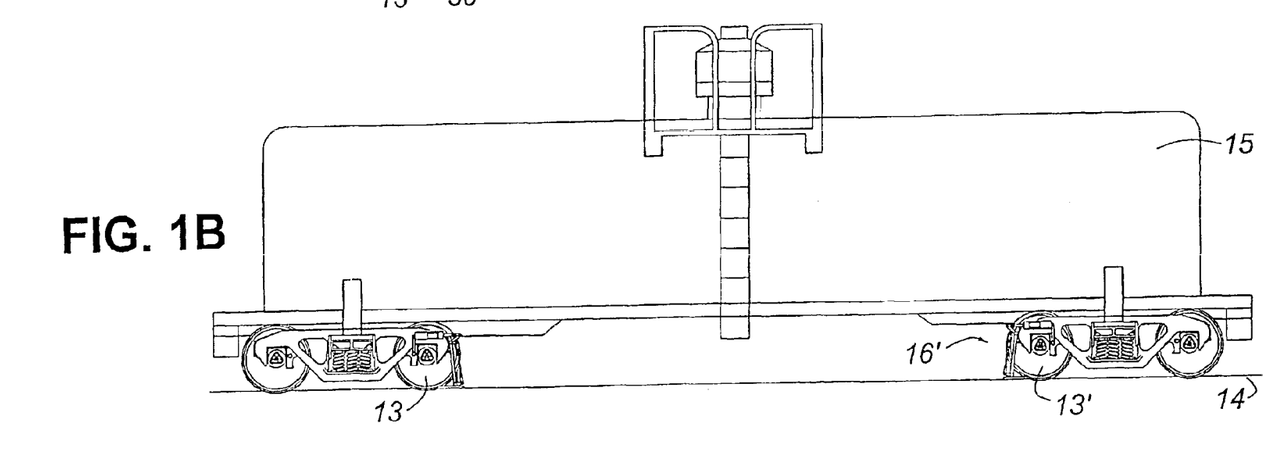

FIG. 1A illustrates two railcar axle mounted chocking devices 16 and 16', in the retracted, or cruise position. FIG. 1B illustrates the railcar axle mounted chocking devices 16 and 16' of FIG. 1A, deployed to the chocking position. The safety chock comprises two parts 16 and 16', mounted on the inner axles 12 and 12', of the railcar 15 for preventing any unauthorized movement of the railcar 15 in either direction on the rails 14, whenever deployed in the chocking position, shown in FIG. 1B. As the two parts 16 and 16' include same elements, the description is made with reference to part 16 only. It is to be noted that the safety chock 16 may be mounted also on the suspension components.

The safety chock 16 is mounted to the trucks 10 on railcar 15 for cooperation with wheel 13 mounted on the inner axle 12. The safety chock 16 is entirely supported by truck 10 when retracted to cruise position, as shown in FIG. 1A. Shoe 30 engages rail 14 and a portion of the periphery of the wheel 13 whenever the safety chock 16 is deployed to the chocking position, shown in FIG. 1B.

Figure 2:
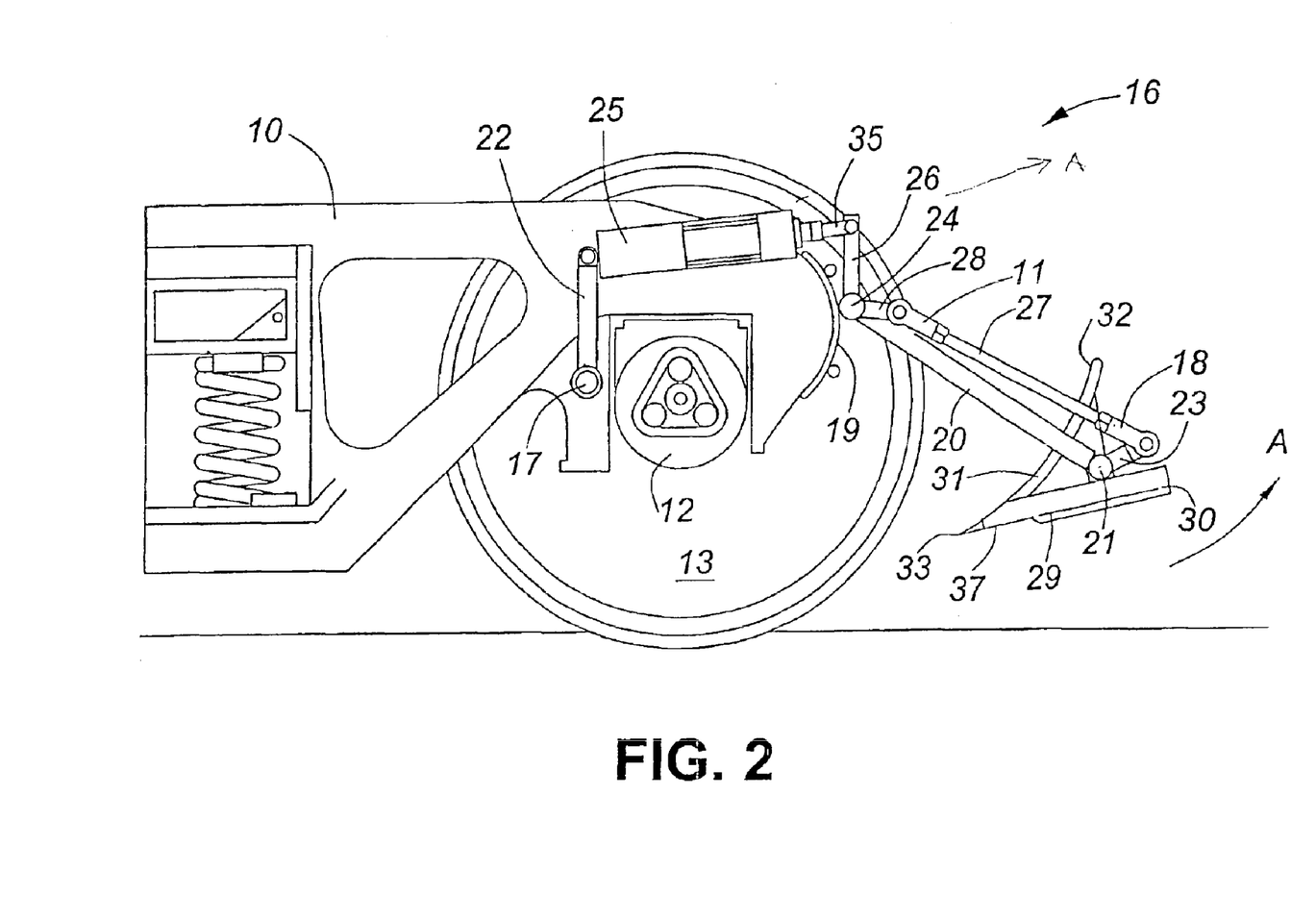
FIG. 2 is a lateral view of a railcar axle mounted safety chock shown in cruise position.
Figure 3A:
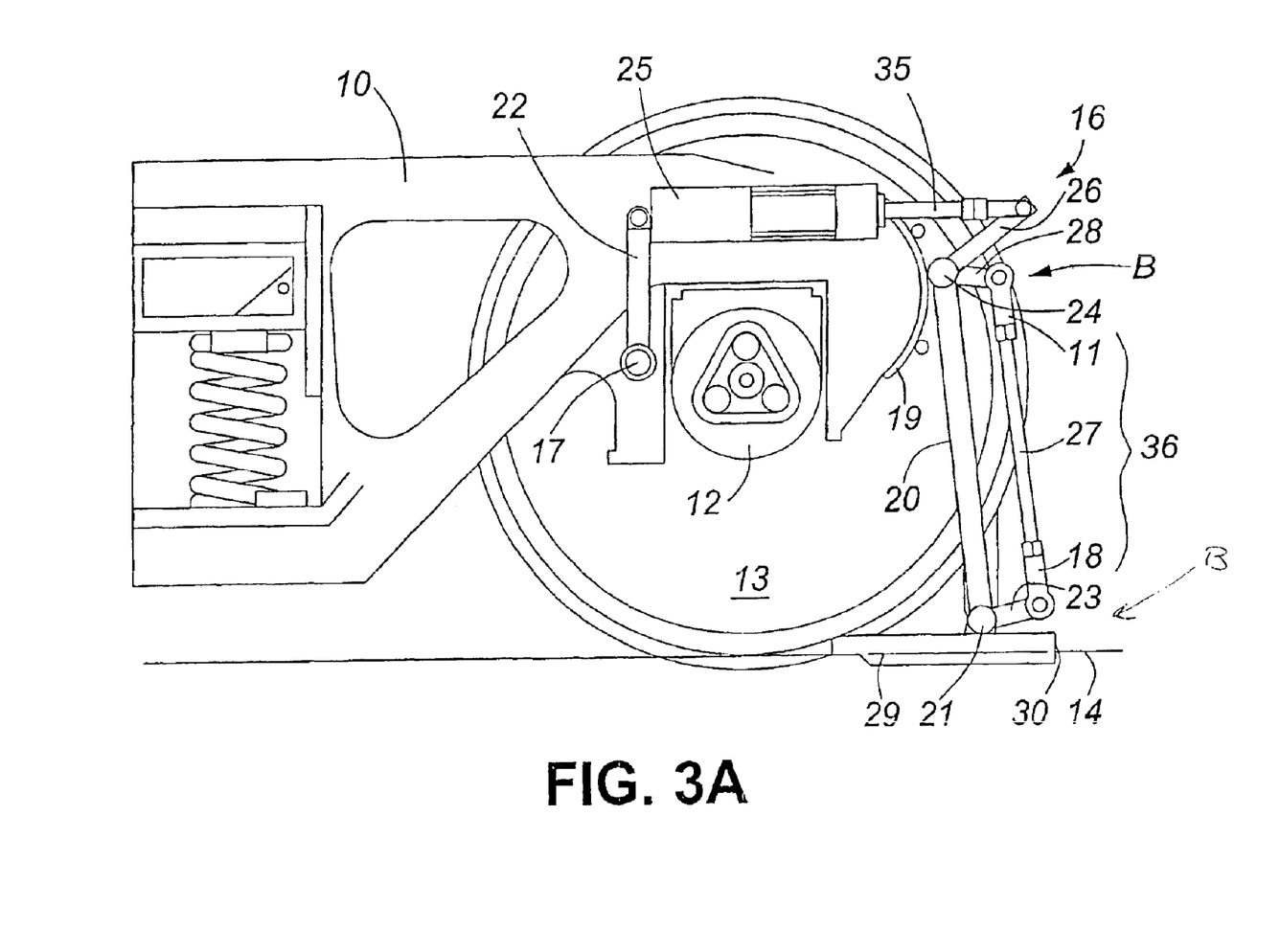
FIG. 3A is a lateral view of the railcar axle mounted safety chock shown in chocking position.
Figure 3B:
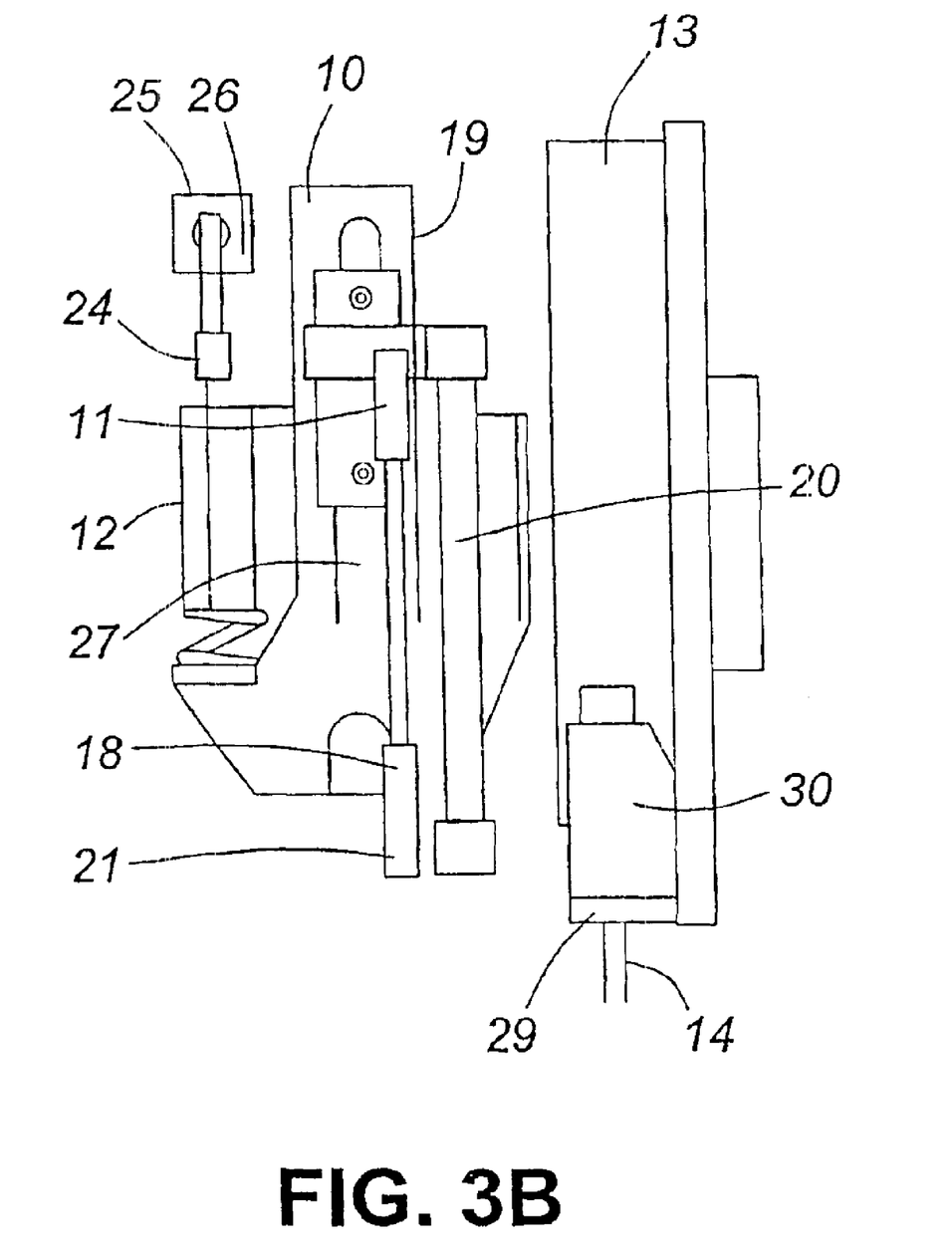
FIG. 3B is an end view of the safety chock of FIG. 3A.

The invention will be now described with reference to FIGS. 2, 3A and 3B. FIG. 2 is a lateral view of the railcar axle mounted safety chock 16 shown in cruise position. Chock 16 is displaced from one position to another by a cylinder 25 and the combined movement of two structural components, as discussed below.

A cylinder mounting arm 22 is rotatably coupled at one end to cylinder or piston 25, and is pivotally mounted to an existing hole 17 at the other end. Piston 25 may use the existing air brake system of the vehicle, or may be differently actuated as it is known in the art. In one embodiment safety chock 16 may use a separate, safety chock's air supply that is charged by the railcar main air supply. The safety chock's air supply is connected to the main air supply via a check valve to prevent bleed hack into the main air supply system. Thus, in the event that the main air supply loses its air, the safety chock will still function normally.

A cylinder rod 35 rotatably connects to an end of a torque arm component. The torque arm component comprises an upper thrust arm 26 connected at one end to the cylinder rod 35. The other end of the upper thrust arm 26 is fixedly mounted on a shaft 24 which is supported by a main mounting bracket 19. A torque arm 20 is fixedly mounted on shaft 24 at one end, while the other end of the torque arm 20 is rotatably coupled to a shoe mounting shaft 21. The torque arm 20, shaft 24, and the upper thrust arm 26 form the torque arm component (20–26) which constitutes an integral body that rotates whenever shaft 24 rotates.

A tierod assembly comprises a lower thrust arm 28 fixedly attached to the main mounting bracket 19 at one end, and rotatably coupled to an adjustable rod 27 at the other end. Rod 27 is rotatably coupled to a shoe thrust arm 23. A first adjustable rod end 11 rotatably coupled with the lower thrust arm 28, and a second adjustable rod end 18 is rotatably coupled to one end of a shoe thrust arm 23. The other end of the shoe thrust arm 23 is rotatably coupled to a shoe mounting shaft 21.

Shoe 30 has a concave, or receiving face 31 with substantially the same curvature as the wheel 13, an underside face 37, and a tip 33. Receiving face 31, which may be lined with a high friction composite material, is adapted to engage a portion of the periphery of the wheel 13 when chock 16 is deployed to the chocking position. Preferably, shoe 30 is of cast aluminum, or any comprimable material, and is structurally reinforced. In addition, the seating or underside face 37 of the shoe 30 is molded to the contour of the rail 14 and is lined with a high friction composite material 29 (better seen in FIG. 3B).

A chock key having a "cruise" position and a "parking" position may be used to remotely, e.g. from the cabin, displace the safety chock 16 to the fully retracted, cruise position, or to displace the safety chock 16 to the operative, chocking position. For displacing the safety chock 16 from chocking position where the shoe 30 is in direct contact with wheel 13 and rail 14 (see FIG. 3A), to cruise position (see FIG. 2), the chock key is turned to "cruise", and the locking cylinder 25 is energized to retract the shoe 30. As the shoe 30 retracts, the upper thrust arm 26 rotates, forcing shaft 24 to rotate, which in turn is forcing the torque arm 20 to rotate and to retract the shoe 30 in cruise position. As shown in FIG. 2, the shoe 30 moves in the direction indicated by arrow "A".

To displace the safety chock 16 from cruise to chocking position, the chock key is turned to "parking", and the locking cylinder 25 is charged to extend the cylinder rod 35. The torque arm 20 and the tie rod assembly 36 slide the shoe 30 in chocking position, as shown in FIG. 3A. Shoe 30 rotates in the direction indicated by arrow "B" due to the combined action of the torque arm component [26-24-20-21] and the tie rod assembly [24-28-27-23-21] to provide optimal wheel braking effect.

Rod ends 11 and 18 are both threaded on rod 27 for adjusting the position of the shoe 30 to properly slide with the tip 33 between wheel 13 and the upper surface of rail 14 without digging into the traveling surface, whenever the safety chock 16 is deployed to chocking position. The lengths and the mounting angles of the torque arms and the tie rods are sized to allow shoe 30 simultaneously engage the wheel and the rail. Additionally, the torque arm 20 may include a threaded part and lock nut (not shown) to modify the length of the torque arm 20 to allow for tore size and tread wear adjustments.

The torque arm component [26-24-20-21] seats and maintains the underside face 37 of the shoe 30 in proper position relative to the rail. The tierod assembly [24-28-27-23-21] positions and seats the receiving face 31 of the shoe 30 in contact with a portion of the periphery of the wheel. Such unique cooperation between the two structures positions and seats the shoe 30 such that the traveling surface and the wheel are engaged at precisely the same time without any interference from the traveling surface.

In one embodiment of the present invention, the locking cylinder 25 may be remotely, e.g. from the cabin controlled to both extend and retract the cylinder rod 35. This action may be controlled by a simple two stage push-pull air release valve. The cylinder rod 35 is provided with friction locks for locking the safety chock 16 in both the fully deployed and the fully retracted positions. Sensors and micro-switches may be used to indicate when the safety chock 16 is fully deployed, or is fully retracted. A light in the cabin may for example indicate when the safety chock 16 is in chocking position.

The safety chock 16 may be raised and lowered manually, by an operator using a chock wrench, or a lever, to turn a lock screw counter-clockwise to drop the chock to chocking position. To reset the safety chock to cruise, the operator turns the lock screw clockwise, then the safety chock 16 is disengaged pneumatically from the cabin, after the operator takes control over the vehicle.

It is noted that, chock 16 may be also used as an emergency braking device at low speeds, similar to a rail skate but more efficient.

Figure 4A:
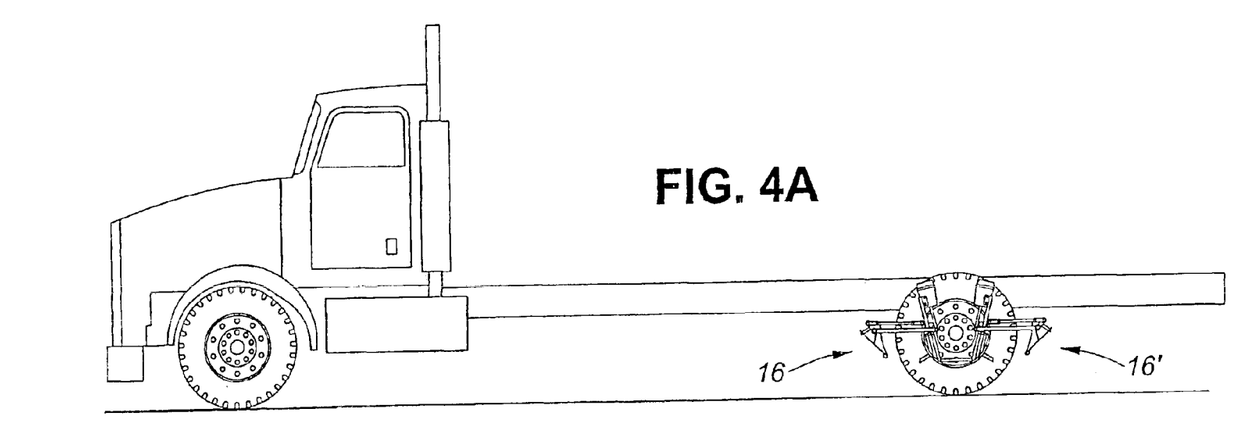
FIGS. 4A and 4B are lateral views of a large truck axle mounted safety chock shown in both cruise and chocking positions, respectively.
Figure 4B:
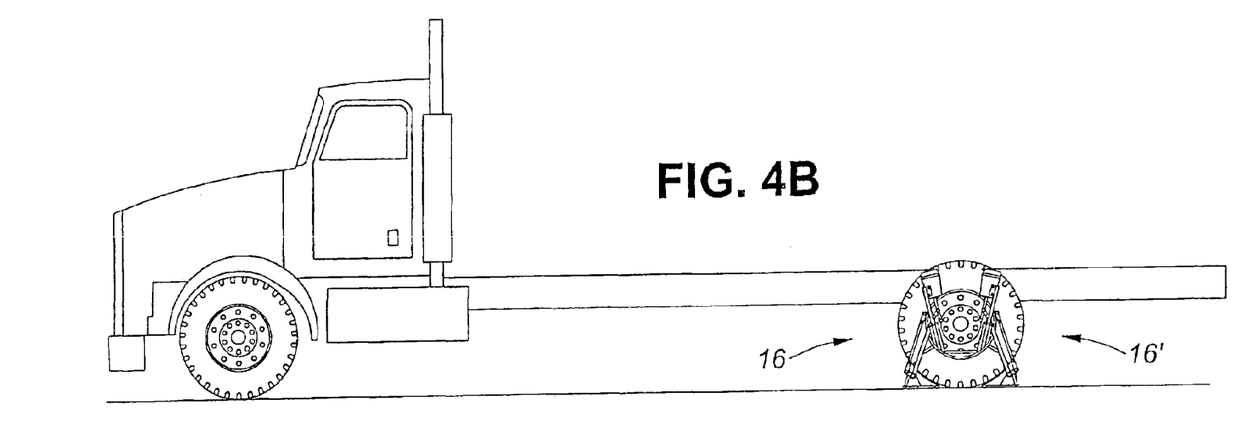

FIGS. 4A and 4B are lateral views of a large truck axle mounted safety chock 16 shown in both cruise and chocking positions. In this embodiment, the dual action safety chock 16 is attached to the axle of the rear wheel of a large truck. Alternative embodiments include placing dual action safety chocks on all wheels, or a plurality of single action safety chocks on a plurality of wheels such that a combination of safety chocks can block the vehicle from moving in both forward and reverse directions.

Figure 5A:
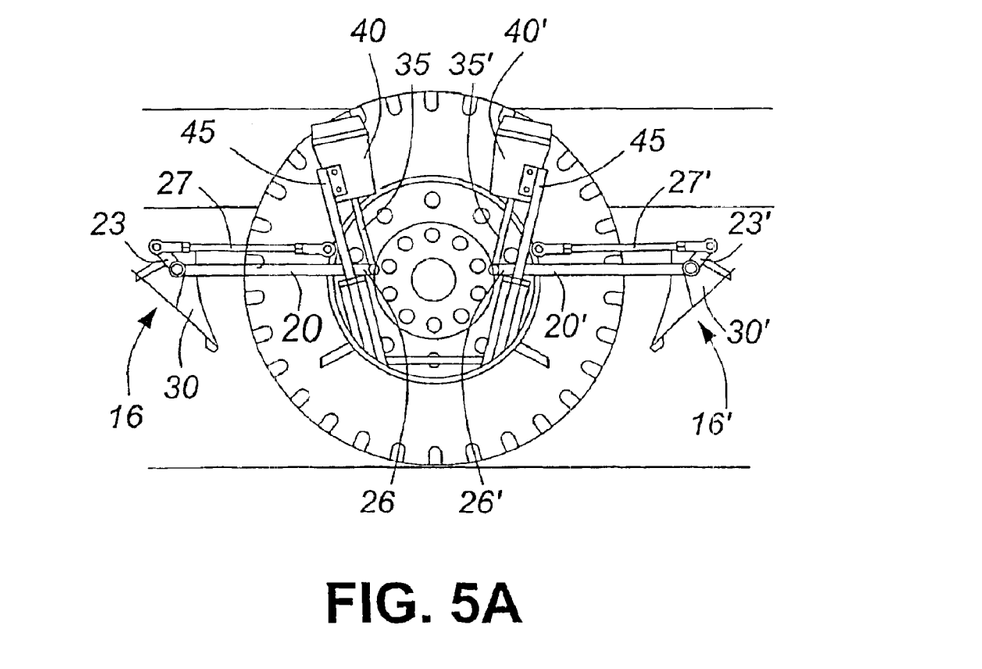
FIG. 5A is a lateral view of a large truck axle mounted safety chock shown in cruise position.
Figure 5B:
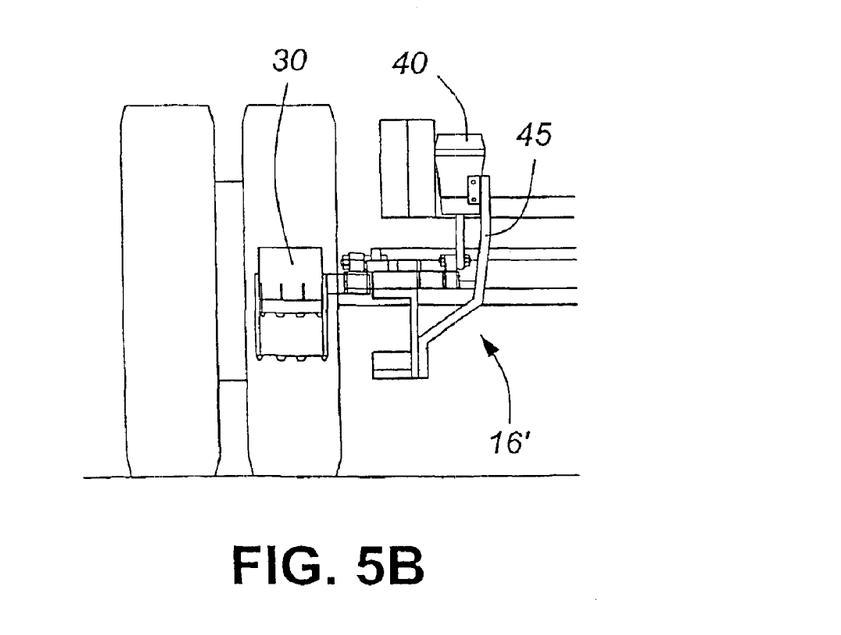
FIG. 5B is an end view of the safety chock of FIG. 5A.

FIG. 5A is a lateral view of an axle mounted dual action safety chock 16, 16', in cruise position. FIG. 5B is an end view of the safety chock of FIG. 5A.

It is understood that the safety chock 16 may be deployed or retracted manually, hydraulically, electrically, or any combinations thereof. In the example of FIG. 5A, a maxi-pot 40 supported by a mounting element 45 is used for displacing the chock 16 from chocking to cruise position. When the maxi-pot 40 is charged, cylinder rod 36 retracts thus raising the safety chock 16 to its cruise position. In cruise position, the torque arm component [26-24-20-21] is substantially parallel to the road to provide safe storage and protection for chock 16, as shown in FIG. 5A.

Figure 5C:
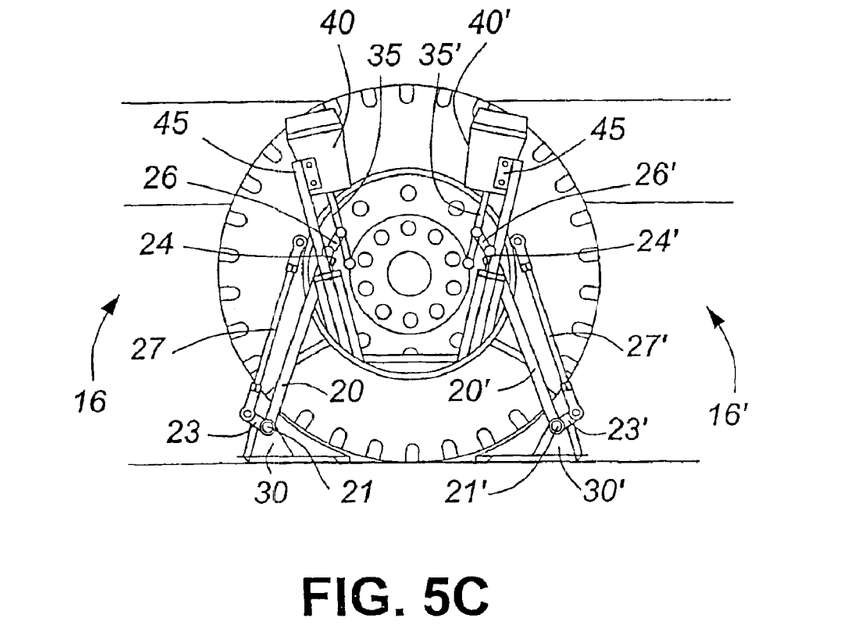
FIG. 5C is a lateral view of a large truck axle mounted safety chock shown in chocking position.
Figure 5D:
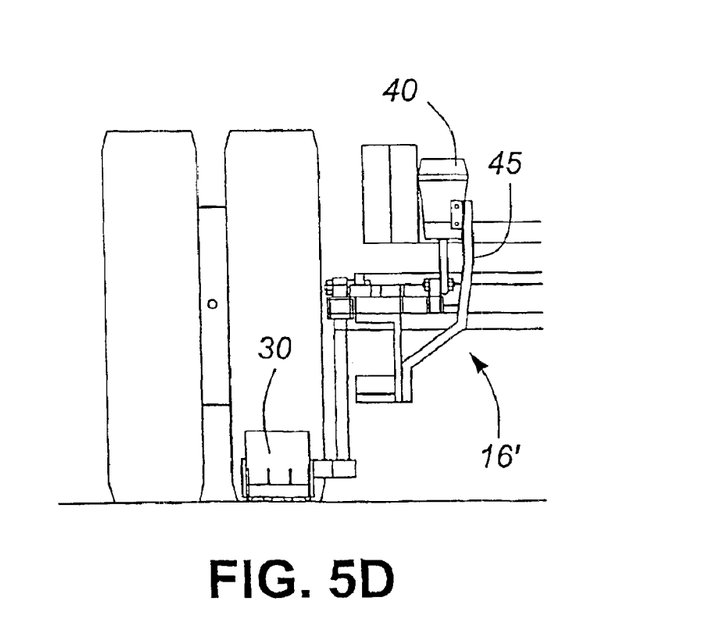
FIG. 5D is an end view of the safety chock of FIG. 5C.

The safety chock 16 is lowered from cruise to chocking position and locked in place by a high-tension spring (not shown) provided in maxi-pot 40. FIG. 5C is a lateral view of the safety chock 16 in chocking position. It is to be noted that the fixed structure including the torque arm component [26-24-20-21] is rectilinear to firmly secure shoe 30 when in chocking position. Shoe 30 may be provided with a toothed underside face 37 to increase the gripping effect on any traveling surface. FIG. 5D is an end view of the safety chock of FIG. 5C.

Figure 6A:
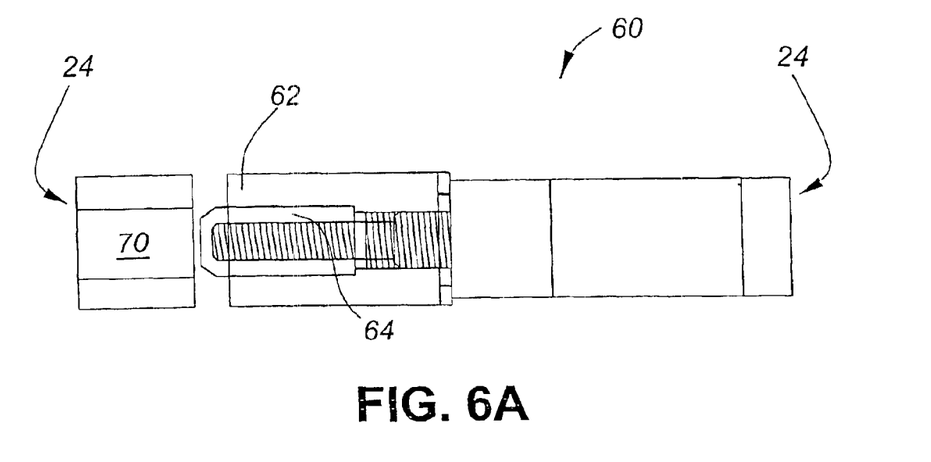
FIG. 6A is a sectional view of a solenoid controlled air actuated locking mechanism.
Figure 6B:
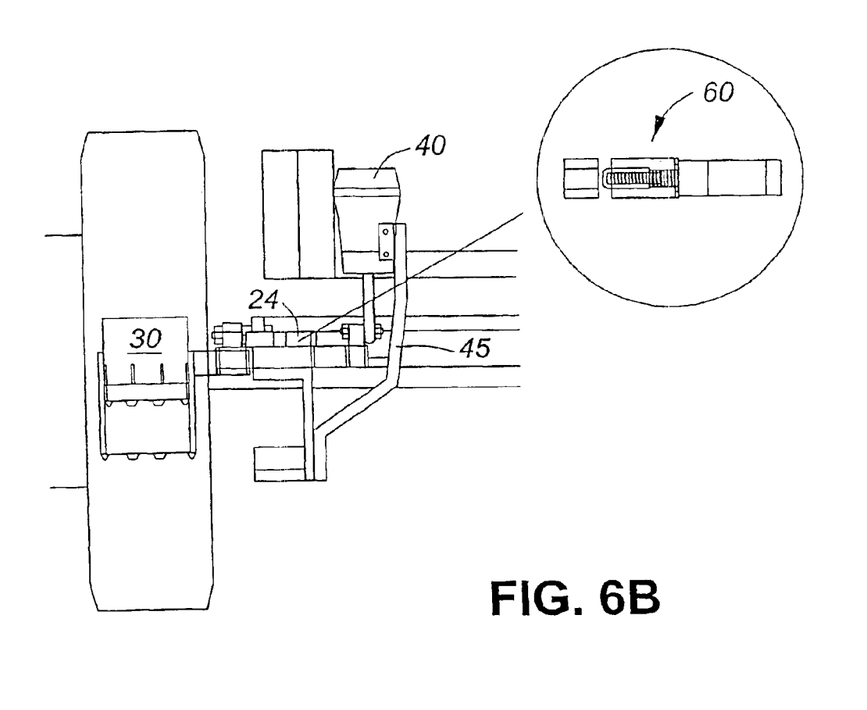
FIG. 6B is a mounting example of the locking mechanism of FIG. 6A.

FIG. 6A illustrates at 60 a locking mechanism comprises a locking pin 62 and solenoid controlled two stage air actuated cylinder 64. Locking pin 62 may be sized to fit any recess, or locking area 70 adjacent to shaft 24 for securing the chock 16 when in cruise position, as shown in FIG. 6B.

When the maxi-pot 40 is charged, the safety chock 16 is raised to its stored, or cruise position. The safety chock 16 is secured in this position by the locking pin 62 which is mechanically connected to the solenoid controlled air actuated cylinder 64. To deploy the safety chock 16 to chocking position, the locking pin 62 is disengaged via the solenoid controlled air actuated cylinder 64, the air is released from the maxi-pot 40 through an air release valve (not shown), and the high-tension spring in the maxi-pot 40 forces the cylinder rod 35 out.

A person skilled in the art will recognize that the maxi-pot 40 may be replaced with any type of cylinder be it hydraulic or pneumatic. As well, the locking mechanism may be a mechanical spring activated device, or a manual lock using for example hook and eye arrangement.

As mentioned before, the safety chock 16, operates independent of the ride or loaded height of the vehicle as it is attached to the axle, or the suspension components of the vehicle, and not to the frame. Such an attachment prevents to "overrun" the shoe as in the case of traditional chocks.

An aspect of this invention is to provide a wheel-blocking system for vehicles used in the transport of goods, in particular dangerous and/or precious cargo, such vehicles including, but not limited to: service and delivery trucks, trailers, buses, rail cars, and tractor-trailer combinations.

The safety chock is not limited to trucks, trains, or other large vehicles and may be used as a safety-blocking device in different situations. For example, this includes but is not limited to mining and marine equipment, overhead cranes, and any other vehicles over ¼ ton up.

The safety chock 16 operates independently from a vehicles main braking/parking system and is designed to be remotely and manually actuated. When mounted on a large vehicle chock 16 may be designed to automatically assume chocking position whenever the maxi-brake is actuated.

The safety chock 16 may also be used as a creeping device in the operation of a vehicle passing up a steep incline when the engine becomes overheated and it is necessary to stop at intervals to allow cooling down. It provides safe stoppage for vehicles up to 20 tons on grades up to 20° and prevents sideway slipping movements. It may also be used as a jacking device by forcing the tire to climb on shoe 30, as well as an anti-theft, key-actuated accessory.

The safety chock 16 is a cost effective solution as it can be used on any type of wheels and therefore, is easy to transfer it from one vehicle to another.

While specific embodiments of the present invention have been described, various modifications and substitutions may be made to such embodiments. Such modifications and substitutions are within the scope of the present invention, and are intended to be covered by the following claims.

What is claimed is:

1. A safety chock for large wheeled vehicle, comprising:
a shoe having a receiving face and a underside face;
a shoe mounting shaft for controlling the position of said shoe with respect to a wheel of a vehicle and the traveling surface;
a tierod assembly fixedly attached to a mounting bracket at a first end and rotatably coupled to said shoe at a second end;
actuating means for rotating a shaft secured to said mounting bracket;
a torque arm component, having:
an upper thrust arm rotatably coupled to said actuating means at a first end and fixedly attached to said shaft at a second end, and
a torque arm fixedly attached to said shaft at one a first end and rotatably coupled to said shoe mounting shaft at a second end
such that when actuated, said torque arm component and said tierod assembly move in concert, said torque arm component for moving said shoe from a cruise position to a chocking position and said tierod assembly for positioning said receiving face of said shoe to engage the periphery of the wheel substantially at the same time said underside face of said shoe is contacting the traveling surface.

2. The safety chock of claim 1, wherein said torque arm forms an unchanging angle with said upper thrust arm.

3. The safety chock of claim 2, wherein said tierod assembly comprises a lower thrust arm fixed to said mounting bracket at said first end and an adjustable rod rotatably coupled to the other end of said lower thrust arm and to a shoe thrust arm at the opposite end, said shoe thrust arm being rotatably coupled to said adjustable rod and to said shoe mounting shaft.

4. The safety chock of claim 3, wherein said mounting bracket is attached to a wheel axle.

5. The safety chock of claim 4, wherein said mounting bracket is attached to suspension components.

6. The safety chock of claim 3, wherein said adjustable rod comprises means for seating and positioning said shoe in optimal chocking position.

7. The safety chock of claim 1, wherein said wheeled vehicle is a truck and said torque arm comprises length adjusting means to compensate for tire size and tread wear.

8. The safety chock of claim 1, wherein said shoe is of reinforced aluminum.

9. The safety chock of claim 1, wherein said actuating means is a hydraulic device.

10. The safety chock of claim 1, wherein said actuating means is a pneumatic device.

11. The safety chock of claim 1, wherein said actuating means is an electrical device.

12. The safety chock of claim 10, wherein said pneumatic device is a primary two stage air cylinder.

13. The safety chock of claim 10, wherein said pneumatic device is a maxi-pot with a high-tension spring.

14. The safety chock of claim 10, wherein said pneumatic device is remotely actuated by using a dedicated air supply.

15. The safety chock of claim 14, wherein said dedicated air supply is connected to the main air supply via a check valve.

16. The safety chock of claim 1, wherein said actuating means rotates said shaft for moving said shoe from said chocking position to said cruise position.

17. The safety chock of claim 1, further comprises a locking mechanism for securing said chock in said cruise position.

18. The safety chock of claim 10, wherein said locking mechanism is a solenoid controlled air actuated locking pin mechanically connected to a secondary two stage air cylinder.

19. A safety chock for large wheeled vehicle, comprising:
a shoe having a receiving face and a underside face;
a shoe mounting shaft for controlling the position of said shoe with respect to a wheel of a vehicle and the traveling surface;
a tierod assembly fixed to a mounting bracket at a first end and rotatably coupled to said shoe mounting shaft at a second end;
actuating means for rotating a shaft secured to said mounting bracket;
a torque arm component for rotating with said shaft, said torque arm component being coupled to said actuating means at one end and to said shoe mounting shaft at another end, for moving said shoe between a cruise position an a chocking position as said shaft is rotated by said actuating means,
wherein said torque arm component and said tierod assembly move in concert, for positioning said receiving face of said shoe to engage the periphery of the wheel substantially at the same time said underside face of said shoe is contacting the traveling surface when said shoe is displaced from said cruise position to said chocking position.

20. The safety chock of claim 19, wherein said torque arm component comprises an upper thrust arm fixedly connected at one end to said shaft, a torque arm fixedly connected to said main shaft and forming an unchanging angle with said upper thrust arm.

* * * * *